Feb. 28, 1950 A. LESTI 2,498,688

DEMODULATOR AND CHANNEL SEPARATOR SYSTEM

Filed June 22, 1946 2 Sheets-Sheet 1

INVENTOR.
ARNOLD LESTI

BY R P Morris
ATTORNEY

DEMODULATOR AND CHANNEL SEPARATOR SYSTEM

Filed June 22, 1946 2 Sheets-Sheet 2

INVENTOR.
ARNOLD LESTI

BY

R. P. Morris
ATTORNEY

Patented Feb. 28, 1950 2,498,688

UNITED STATES PATENT OFFICE 2,498,688

DEMODULATOR AND CHANNEL SEPARATOR SYSTEM

Arnold Lesti, New York, N. Y., assignor to Federal Telecommunication Laboratories, Inc., New York, N. Y., a corporation of Delaware Application June 22, 1946, Serial No. 678,703

7 Claims. (Cl. 179—15)

Figure 1:
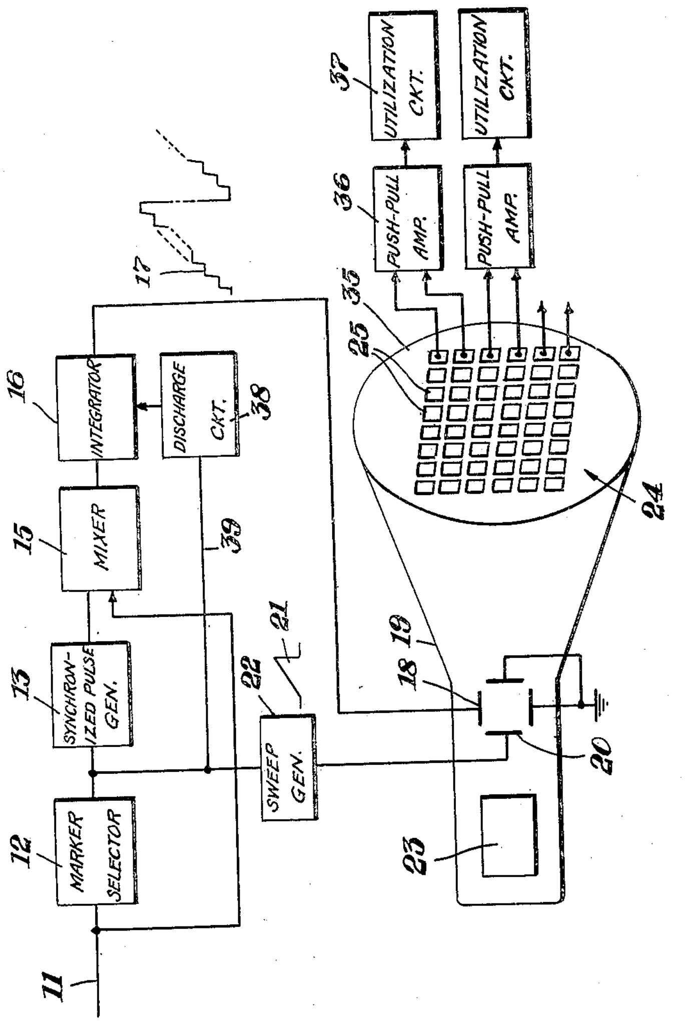

This invention relates to a demodulator and channel separator system for multi-channel time modulated pulse communication systems.

In one type of multi-channel time modulated pulse communication system the train of pulses consists of a succession of series of pulses, each series consisting of a marker signal followed by a number of signal pulses, each signal pulse of a series forming part of a separate signal channel. The time relationship of the signal pulses is varied with respect to their associated marker signal to carry the modulation. It has heretofore been proposed to utilize a cathode ray tube having a plurality of target elements for separating the channels and demodulating the time modulated pulses, as is described for example, in the copending U. S. application of D. D. Grieg for "Multi-channel system," Serial No. 625,650, filed October 30, 1945, now Patent No. 2,485,591, granted October 25, 1949. In the aforesaid application, the channel separation and demodulation is accomplished by generating voltage sweeping a beam at a continuous rate of speed across the faces of a plurality of target elements and only turning on the beam at times determined by the pulses, the time modulation of the pulses controlling the amount of a given target element swept by the turned-on beam. According to the present invention, the cathode ray beam is always turned on during operation of the system but the velocity of deflection of the beam is varied so that as the beam is swept across the target elements, it remains on a given target element for a length of time determined by the time modulation of the pulse controlling said sweep. Further in accordance with the present invention, use is made of a push-pull arrangement to produce certain advantages such as the diminution of cross-talk effects, etc.

An object of the present invention is the provision of an improved demodulator system for time modulated pulse systems.

Another object of the present invention is the provision of an improved channel selector and demodulator for multi-channel time modulated pulse systems.

Another object of the present invention is the provision of a demodulation system for time modulated pulses in which use is made of a cathode ray tube.

An advantage of the present invention over the prior art is the increase in output achieved in comparison with the prior art due to the fact that according to the present invention the transit time of the electron beam, in moving between the target elements, is very fast while there is a delay on the elements themselves. This distinguishes from the prior art in which there is a fairly rapid rate of speed of the beam at all times since the beam moves at a uniform speed. Consequently in the present invention the beam is on the target elements for longer periods than in the systems of the prior art.

Another advantage of the present invention is the reduction of distortion since the system of the present invention is not critical as to the exact position of the beam and is also not critical as to the configuration thereof. Furthermore, the present system is more easily adjusted, is not as critical with regard to drift of the beam from an exact position, and tends to lessen or reduce cross-talk since the target elements are passed so that cross-talk induced in two target elements which are associated in push-pull tends to cancel itself out.

Figure 2:
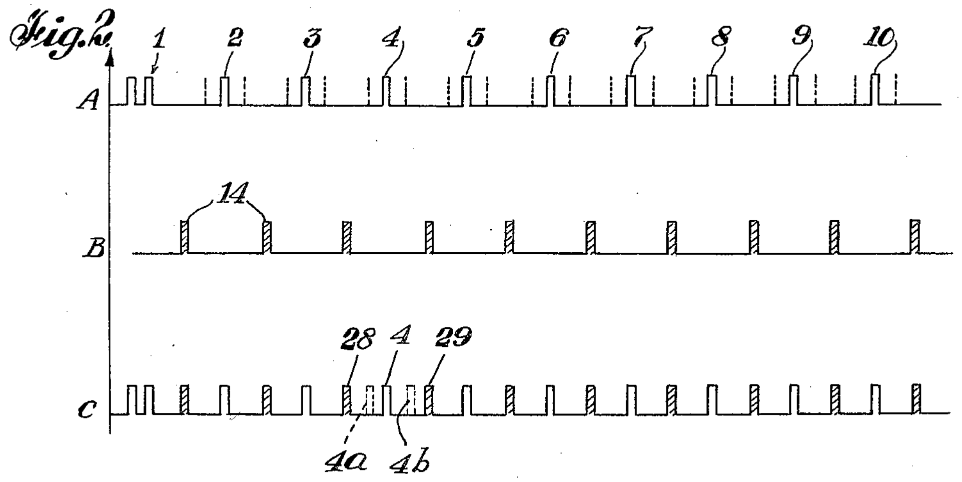
Figure 3:
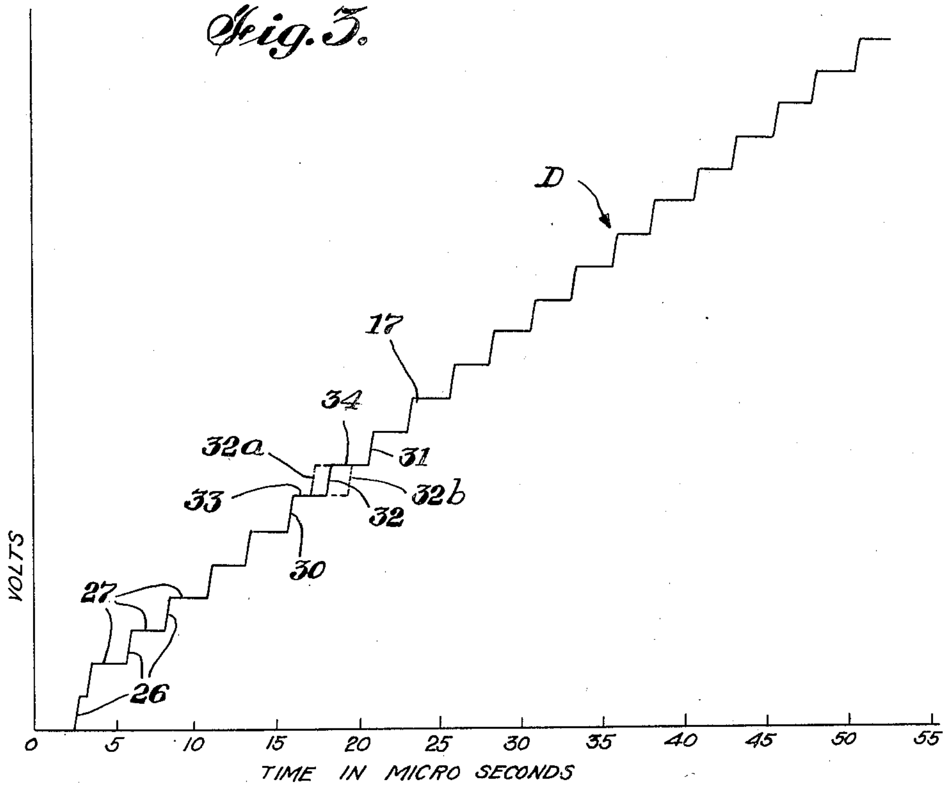

Other and further objects of the present invention will become apparent and the invention will be best understood from the following description of an embodiment thereof, reference being had to the drawings, in which:

Fig. 1 is a schematic and block diagram of a system embodying the present invention; and Figs. 2 and 3 are sets of curves used in explaining the operation of the system of Fig. 1.

Referring now to the drawings, a train of pulses, such as those illustrated in curve A, Fig. 2, are fed into the channel selector and demodulator system of Fig. 1. These pulses may consist of a marker signal 1, consisting of a double pulse, followed by a succession of signal pulses 2—10, which in curve A, are shown in their unmodulated position and may be modulated between the limits indicated by the dotted lines on each side of said signal pulses. Each of the signal pulses 2—10 forms part of a separate channel. The entire series of pulses 1—10 is followed by a succession of similar series of pulses to form a pulse train. Such pulse trains may be used to modulate a carrier wave and radiated. This wave may be received by any suitable receiver and the carrier frequency removed to thereby reproduce the pulses substantially as shown. The pulses may then be fed to a channel selector and demodulator system, of the type indicated in Fig. 1, with the pulses being fed in along line 11 in said figure.

The marker signal 1 is selected by a marker selector 12, which may be of the type indicated in said copending application and the output of marker selector 12 is used to synchronize a synchronized pulse generator 13 to produce in response to each selected marker signal, a train of pulses, such as indicated in curve B, which pulses are positioned between the signal pulses, that is, they occur in time substantially mid-way between the signal pulses when the latter are unmodulated. The pulses generated by pulse generator 13, hereinafter termed the "fixed pulses" 14, and indicated along curve B of Fig. 2, are fed to a mixer 15 where they are mixed with the signal pulses of curve A, the latter being fed to said mixer to produce a train of pulses such as illustrated in curve C of Fig. 2. These combined pulses are then fed to an integrating network 16 to produce a voltage wave 17, as illustrated in curve D, Fig. 3, which is in the form of a stepped sawtooth.

The stepped voltage wave 17 is used to deflect the beam of a cathode ray tube in one Cartesian coordinate, such as for example, vertically. For this purpose, the output of integrator 16 is connected to one set of deflection plates 18 of a cathode ray tube 19, whose other set of deflection plates 20 has a sawtooth voltage 21 applied thereto from a sawtooth sweep circuit generator 22, the sawtooth generator 22 being controlled by the marker pulse output from marker selector 12. The duration of sawtooth wave 21 is sufficient to include one stepped vertical sweep 17 for each vertical row of target elements used. The cathode ray tube 19 includes the usual electron gun 23 which is during operation biassed so that the beam is always turned on. The electron beam of tube 19 is swept across an aperture plate 24 which also serves as a collector electrode. Behind the apertures of aperture plate 24 there is positioned a plurality of secondary emission electrodes 25 arranged in vertical rows which are slightly tilted so that as the sawtooth wave 21 is applied to the horizontally deflecting electrodes 20, the beam will travel along a row of the secondary emission target elements 25 and then sweep on to the next row when the beam starts another vertical movement for scanning. This movement of the beam under the control of the sweep voltage 17 and sawtooth voltage 21 is similar to the line and frame scanning technique in television. It will be clear that if desired a stepped sweep voltage similar in form to wave 17 but with constant duration steps may be used for the horizontal scan.

Since the pulses of curves A, B, and C are of the same amplitude, (and this may be insured by the use of limiters and shaping circuits, not shown), the rise 26 of each of the steps of waveform 17 will be equal. Consequently, deflection plates 18 will deflect the beam a constant amount from step to step since the amount of this deflection is determined by the height of the rises 26. The beam will be moved at each rise from one of the target elements 25 to the next one in the same row. The length of time the beam will remain at each of the target elements is determined by the duration of the tread portions 27. The duration of the tread portions 27 will depend upon the time modulation of the pulses.

Analysis of a single signal pulse and its two adjacent fixed pulses will indicate the effect of the time modulation of the signal pulse upon the wave-form 17 and upon the deflection of the beam. For example, considering pulse 4 and its adjacent fixed pulses hereinafter specifically designated by the numerals 28 and 29, it will be seen that rises 30 and 31 will occur at times fixed by the fixed pulses 28 and 29, whereas the rise 32, due to pulse 4, will vary, consequently varying the respective lengths of treads 33 and 34. For example, if pulse 4 is at one extreme of modulation 4*a*, its rise 32 will be moved to position 32*a* consequently making tread 33 considerably shorter than tread 34. When pulse 4 is at its other extreme of modulation, 4*b*, the rise 32 will be at position 32*b* and tread 33 will be much longer than tread 34. As has been stated before, the effect of different lengths or duration of the treads is to determine the length of time during which the beam lingers on a given target element 25. Succeeding elements 25 in each row are paired together as indicated at 35 and connected to a push-pull arrangement 36, which push-pull arrangement may be an amplifier. The voltage output of the target elements, since they are secondary emission electrodes, is proportional to the length of time that the spot remains on said elements. As indicated above, the length of time the spot remains on one target element of an associated pair varies inversely with respect to the length of time it remains on the other element of said pair. Thus the elements of each pair are placed in a push-pull relation and there is a reinforcement of their potentials and an addition of their respective voltage changes in the push-pull amplifier to which they are connected. The output of said amplifier may be fed to any suitable utilization device 37, which may be for example, a sound reproducer.

Succeeding pairs of the target elements in each row are likewise connected to push-pull amplifiers and utilization devices, each such push-pull amplifier and utilization device serving as a separate channel to which the signal information intended for said channel is fed.

At the end of each series of pulses, such as for example 1—10, the integrator 16 is discharged and this may be accomplished by a suitable discharging circuit 38 which preferably has as rapid a discharge as possible. The discharge circuit may be controlled by the selected marker pulse derived from marker selector 12, as is indicated by line 39. If there are too many channels to permit arranging corresponding target elements in a single row, the intergrated wave-form 17 may be divided into a number of smaller stepped waves by having the discharge circuit operate more than once for each series of pulses. Numerous other changes from the foregoing description will readily suggest themselves to those versed in the art.

Accordingly, while I have described above the principles of my invention in connection with specific apparatus, it is to be clearly understood that this description is made only by way of example and not as a limitation on the scope of my invention.

I claim:

1. In a demodulator system for multi-channel time modulated pulses including a synchronizing signal, a cathode ray tube having target elements corresponding to separate channels, means for deflecting the beam in said tube successively across said target elements, and means controlling, in synchronism with the average repetition rate of the synchronizing signal, deflection of the beam, and responsive to the time modulation of the pulses for varying the length of time that said beam is directed at each of said target elements.

2. In a channel separator and demodulator for multi-channel pulse communication systems of the type in which a plurality of channels are interleaved in sequence in the form of a single multi-channel pulse train, with one of said channels having pulses provided with an identifying characteristic distinct from the pulses of the other channels for use as synchronizing pulses, and the pulses of at least a given one of said channels being time modulated signal pulses; a cathode ray tube having a plurality of target elements, means for producing from a series of said pulses a sweep wave of stepped wave-form, and means responsive to said wave for deflecting the beam in said tube across said target elements at a speed varying in response to the variation of the time modulation of said pulses.

3. In a channel separator and demodulator for multi-channel pulse communication systems of the type in which a plurality of channels are interleaved in sequence in the form of a single multi-channel pulse train, with one of said channels having pulses provided with an identifying characteristic distinct from the pulses of the other channels for use as synchronizing pulses, and the pulses of at least a given one of said channels being time modulated signal pulses; a cathode ray tube having a plurality of target elements, means for integrating a series of said pulses to produce voltages having a stepped wave-form, and means responsive to the voltages of said wave-form to deflect the beam in said tube across said target elements, whereby the length of time said beam is directed at a given target element varies in accordance with the time modulation of the pulses.

4. A system according to claim 3 further including means for beginning a new wave-form with the next series of said pulses.

5. In a channel separator and demodulator for multi-channel pulse communication systems of the type in which a plurality of channels are interleaved in sequence in the form of a single multi-channel pulse train, with one of said channels having pulses provided with an identifying characteristic distinct from the pulses of the other channels for use as synchronizing pulses, and pulses of at least a given one of said channels being time modulated signal pulses; a cathode ray tube having a plurality of target elements, means for selecting the synchronizing pulses, means responsive to said synchronizing pulses for producing a plurality of pulses fixed in time with relationship to each other, means for interleaving said fixed pulses between the incoming channel pulses, means for integrating the resultant output to produce voltages having a stepped waveform, means responsive to said voltages for deflecting the beam in said cathode ray tube across said elements, the time modulation of the channel pulses determining the length of time at which the beam is directed at a given target element, means connecting pairs of succeeding target elements in push-pull, and suitable utilization means coupled to the output of said push-pull means.

6. A system according to claim 3 in which said target elements are arranged in a group of rows, and further including a sweep circuit generator controlled by said synchronizing pulses for periodically deflecting the beam from row to row for each succeeding stepped wave-form.

7. A system according to claim 3 in which said target elements are secondary emission electrodes, said tube further including collector means.

ARNOLD LESTI.

REFERENCES CITED

The following references are of record in the file of this patent:

UNITED STATES PATENTS

| Number | Name | Date |
|---|---|---|
| 2,189,898 | Hartley | Feb. 13, 1940 |
| 2,263,369 | Skillman | Nov. 18, 1941 |
| 2,265,216 | Wolf | Dec. 9, 1941 |
| 2,395,467 | Deloraine | Feb. 26, 1946 |